Feb. 27, 1973   R. J. BUKOWSKI ET AL   3,718,244
APPARATUS FOR READING PRE-PROGRAMMED CARDS AND PRINTING THEREON
Filed Feb. 26, 1970   6 Sheets-Sheet 1

INVENTORS
Raymond J. Bukowski
Raymond L. Brija
Florian F. Yanikoski
BY Johnson, Dienner, Emrich, Verbeck & Wagner
ATTYS.

INVENTORS
Raymond J. Bukowski
Raymond L Brija
Florian F. Yanikoski

BY Johnson, Dienner, Emrich,
Verbeck & Wagner
ATTYS.

INVENTORS
Raymond J. Bukowski
Raymond L. Brija
Florian F. Yanikoski
BY Johnson, Dienner, Emrich,
Verbeck & Wagner
ATTYS.

Feb. 27, 1973 R. J. BUKOWSKI ET AL 3,718,244
APPARATUS FOR READING PRE-PROGRAMMED CARDS AND PRINTING THEREON
Filed Feb. 26, 1970 6 Sheets-Sheet 5
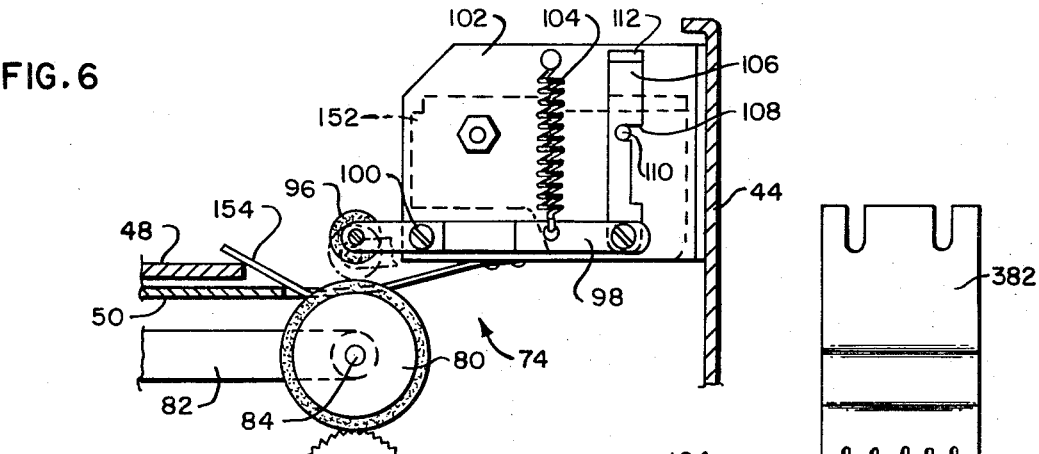
FIG. 6
FIG. 12
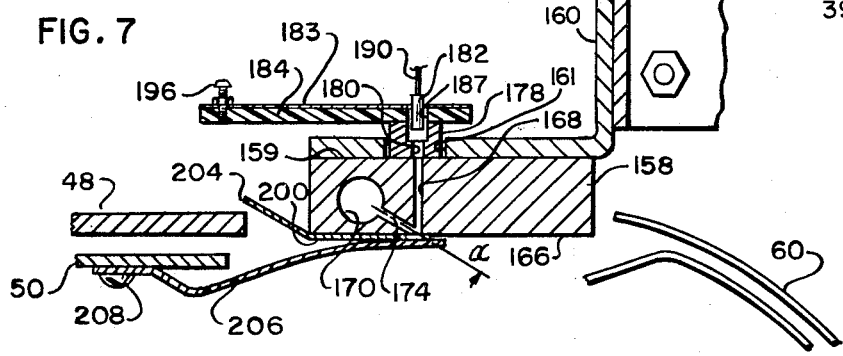
FIG. 7
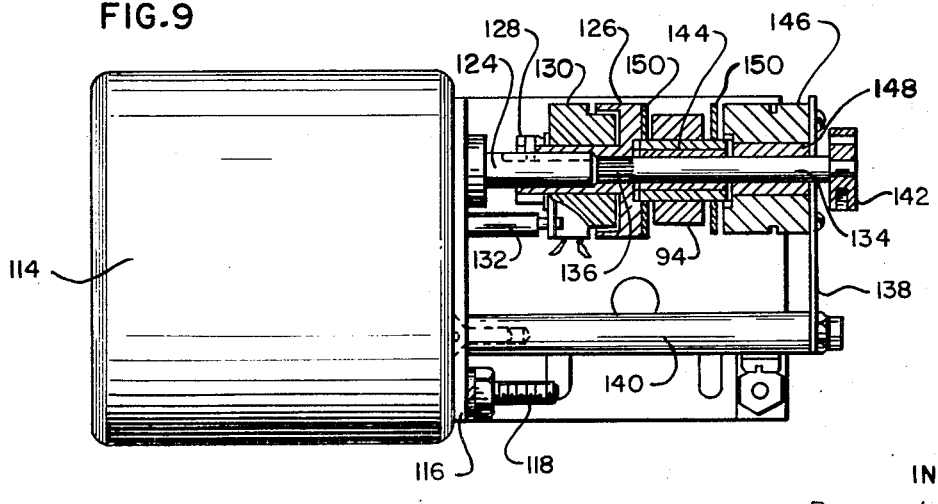
FIG. 9
INVENTORS
Raymond J. Bukowski
Raymond L. Brija
Florian F. Yanikoski
BY Johnson, Dienner, Emrich,
Verbeck & Wagner
ATTYS.

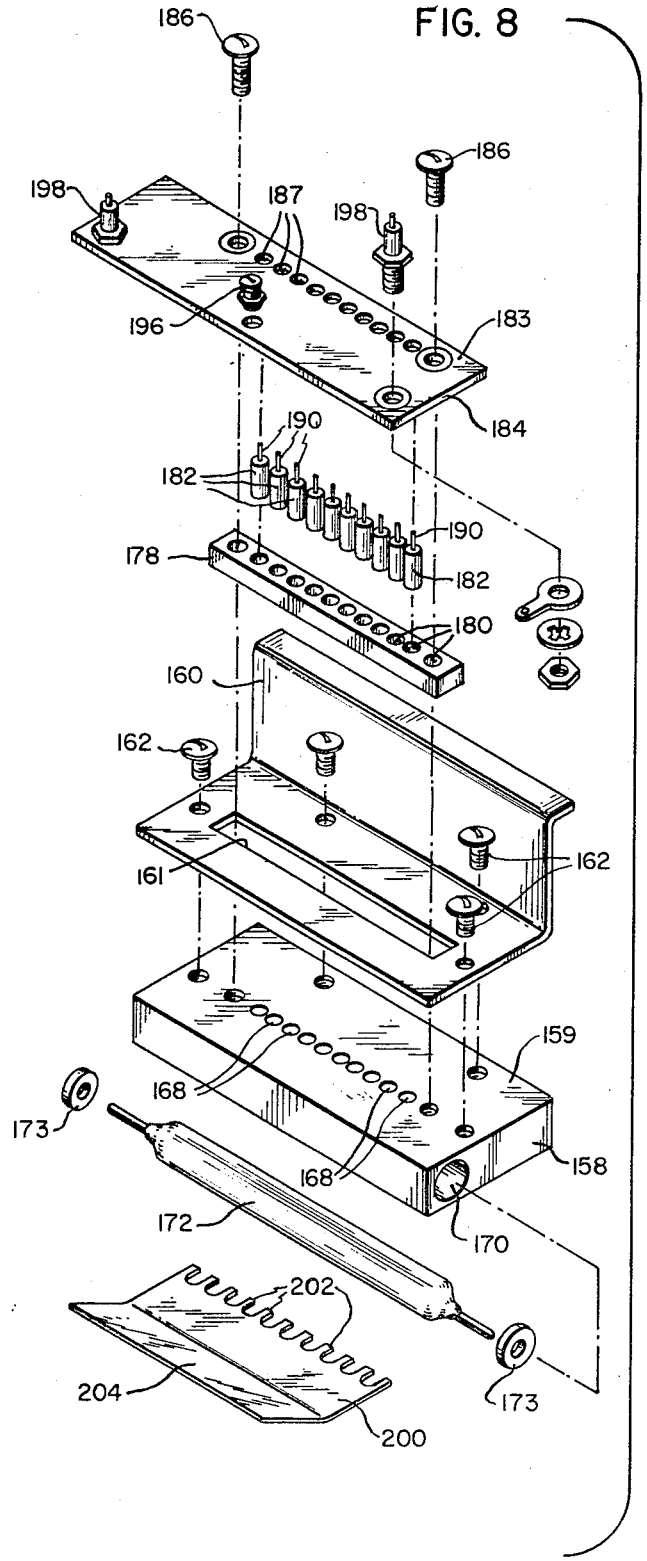
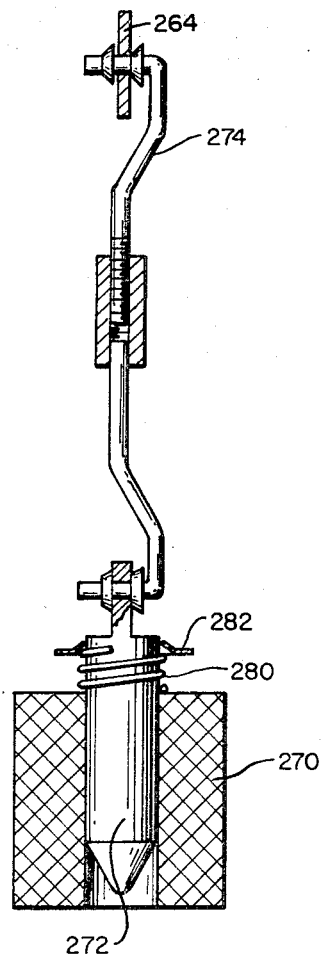

United States Patent Office 3,718,244
Patented Feb. 27, 1973

3,718,244
APPARATUS FOR READING PRE-PROGRAMMED CARDS AND PRINTING THEREON
Raymond J. Bukowski, Chicago, and Raymond L. Brija, Villa Park, Ill., and Florian F. Yanikoski, Braintree, Mass., assignors to Motiongraph, Inc., Chicago, Ill.
Filed Feb. 26, 1970, Ser. No. 14,608
Int. Cl. B41j 13/00
U.S. Cl. 197—127
24 Claims

ABSTRACT OF THE DISCLOSURE

Apparatus for transporting, reading and printing a sales order card having index registration indicia thereon, a program area having order data selectively disposed thereon, and a printing area to receive printed indicia thereon, including card guide means adapted to selectively transport a card through the apparatus, a scanning head adapted to detect the position of the card and produce output signals responsive to order data on the card, and printing means responsive to signals from the scanning head to selectively print indicia on the printing area of the card.

BACKGROUND OF THE INVENTION

The present invention relates to transport apparatus, and particularly to such an apparatus for effecting controlled movement of a sales order data card through a guide path, reading data selectively disposed on the card, and selectively printing indicia on the card responsive to the data on the card.

In retail establishments such as stores, restaurants and the like, it is a common practice for a sales clerk to manually enter a customer's order on a sales check or order bill. Generally, the sales clerk or waiter enters the price of each item ordered, totals the individual items ordered or purchased, calculates any applicable taxes, and establishes the total cost to the customer. In some instances, the clerk or waiter takes the sales check or bill to a cashier who then enters the prices of the individual items purchased by means of a cash register or like instrument, totals the bill and returns it to the clerk for presentation to the customer.

In both of the above examples, the unit price of each item purchased and entered on the sales check or bill is inserted by the sales clerk or cashier who also calculates the applicable taxes. This generally requires the clerk or cashier to refer to a price list or otherwise have knowledge of the prices of many items, as well as applicable tax rates. The task of remembering the prices of many individual items and entering the correct prices on the sales check leads to human error which results in incorrect billing, time consuming corrections, customer dissatisfaction, etc.

The present invention is concerned with overcoming the above disadvantages in manual order-pricing techniques through providing a transport apparatus for use in conjunction with a sales order card or bill having orderable item lines which may be marked by a clerk to indicate the particular item and quantity of such item desired by a customer. The transport apparatus is adapted to receive the card and, in conjunction with associated electronic calculating means, is adapted to print the price for each ordered item line, the applicable taxes, and the total price to be paid by the customer, thus substantially eliminating the element of human error.

SUMMARY OF THE INVENTION

One of the primary objects of the present invention is to provide a transport apparatus for use with a sales order card or like instrument having registration indicia thereon and orderable item lines associated with the registration indicia, the transport apparatus being adapted to receive and pass the card therethrough during which time the apparatus scans a program area of the card and effects selected printing on the card responsive to data selectively disposed on the program area of the card.

Another object of the present invention is to provide a transport apparatus for use in conjunction with electronic calculating means, the apparatus having reader head means for simultaneously directly scanning the registration indicia and program data areas of a card as the card is passed therethrough, and having printing head means to effect printing on the card.

Another object of the present invention is to provide a transport apparatus and order card combination wherein the card has selected registration and program indicia thereon, and the apparatus is adapted to transport the card through a guide path, directly scan the registration and program indicia areas on the card, and effect printing on the card by means of a novel printing head and inking ribbon support arrangement.

In carrying out the objects of the present invention, a sales order card or bill is provided having registration indicia disposed longitudinally along one edge, selectively programmed orderable item lines disposed in selected relation with the registration indicia, and an area upon which indicia such as prices may be printed to correspond with the item lines. A transport apparatus is provided having a guide path therethrough to receive an order card, means to selectively move the card through the guide path and stop the card when indicia selectively programmed adjacent the ordered item is detected by a scanning head, and printing means adapted selectively to print numerical digits on the printing area of the card responsive to output signals from the scanning head.

Further objects and advantages of the present invention, together with the organization and manner of operation thereof, may best be understood by reference to the following description of a preferred embodiment of the invention when taken in conjunction with the accompanying drawing, in which like reference numerals designate like parts throughout the several views.

BRIEF DESCRIPTION OF THE DRAWING

FIG. 6 is a partial side view showing the car drive wheel, pressure roller, and starting switch;

FIG. 7 is a partial sectional view taken generally along the line 7—7 of FIG. 4 showing the scanner head assembly and support therefor;

FIG. 8 is an exploded perspective view of the scanner head assembly;

FIG. 9 illustrates the drive motor and associated clutch mechanism for advancing a card through the transport mechanism and actuating the ink ribbon advance mechanism;

FIG. 11 is an enlarged partial sectional view of a printing hammer actuating linkage and solenoid; and FIG. 12 is a plan view of the separator for normally maintaining a card in spaced relation from the ink ribbon.

DESCRIPTION OF A PREFERRED EMBODIMENT

Figure 1:
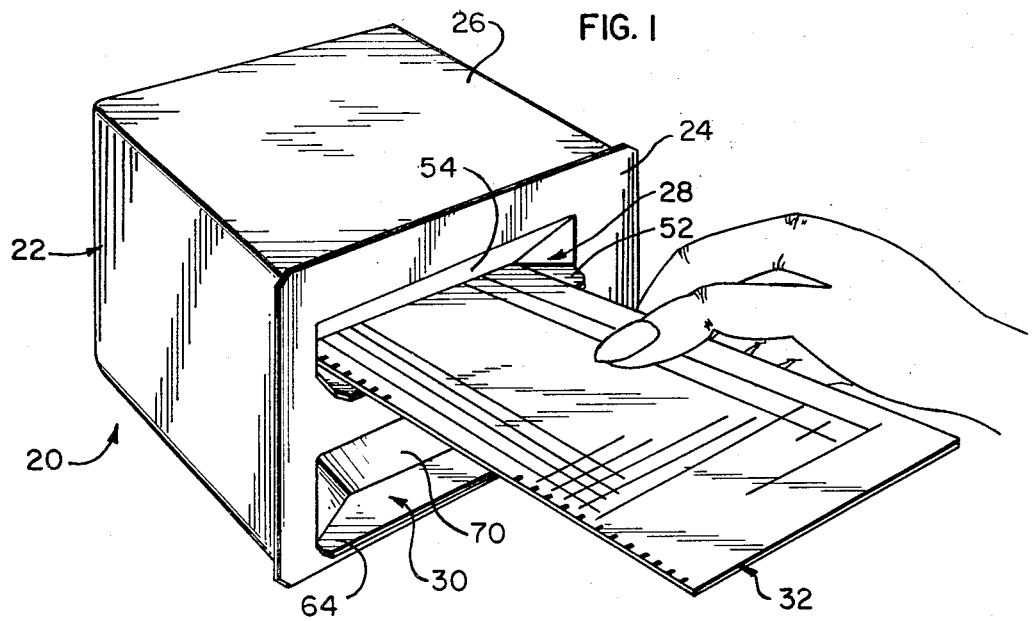
FIG. 1 is a perspective view of a transport apparatus constructed in accordance with a preferred embodiment of the present invention, with an order card being introduced into the mechanism.

Referring now to the drawing, and in particular to FIG. 1, a transport apparatus constructed in accordance with a preferred embodiment of the present invention is indicated generally by reference numeral 20. The transport apparatus 20 is illustrated as being embodied in chassis means, indicated generally at 22, having a generally square configuration with a front plate 24 and a removable closure casing 26 having upper, lower, side and rear planar surfaces. The portion of the chassis means 22 defining the outer envelope or configuration of the transport apparatus 20 allows the apparatus 20 to be readily installed in and removed from a suitable support console (not shown) for interchange or adjustment, the console serving to further support associated electronic calculating means which may be readily connected to the transport apparatus 20 as will be more fully described hereinbelow.

The front plate 24 of the chassis means 22 includes a card receiving entrance 28 and a card exit or return opening 30. The card receiving opening 28 and exit opening 30 comprise the entrance and exit portions of guide path means defined within the chassis 22 and adapted to receive a card, such as indicated at 32, and selectively guide the card 32 through the transport apparatus 20 as will become more apparent hereinbelow.

Figure 2:
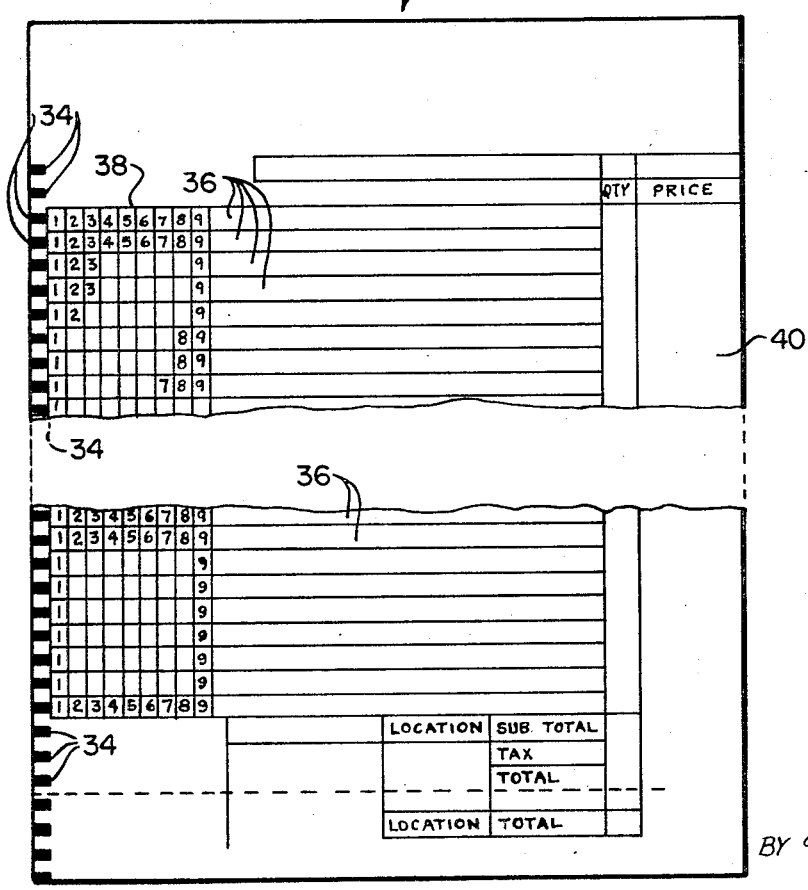
FIG. 2 is a foreshortened plan view of an order card for use with the transport apparatus of the present invention.

Referring to FIG. 2, the card 32 for use in combination with the transport apparatus 20 comprises a generally planar rectangular sales order card or item order bill made of a suitable material such as heavy paper. The card 32 has index registration indicia thereon comprising a plurality of black inked markings 34 equidistantly spaced longitudinally along the left hand edge of the card 32. The card 32 has a plurality of orderable item lines 36 having predetermined orderable items printed thereon which may be purchased by a customer in a retail or wholesale store, a restaurant, or other similar business establishment. The item lines 36 are positioned on the card 32 such that each item line is associated with one of the index registration markers 34. Preferably, two index registration marks 34 are provided above the first orderable item line 36 for a purpose to be described more fully below. The left hand portion of each of the item lines 36 comprises a program area 38 upon which a sales clerk or other business employee may insert a suitable pencil marking to selectively indicate the particular item and quantity thereof desired by the customer. To this end, a plurality of numerals such as 1–9, are provided on the program area of each of the item lines 36 allowing the sales clerk to indicate the desired quantity of each item desired by a customer by marking one of the numerals.

The sales order card 32 is inserted into the transport apparatus 20 with the printed format surface facing upwardly and includes an area, designated at 40, upon which numerical characters or other suitable indicia may be printed for entry of selected price information or the like corresponding to the orderable item lines 36. For example, a first column entitled "QTY" is provided upon which the quantity of each item ordered may be printed, and a second column entitled "PRICE" is provided upon which the price for the quantity of each item order may be printed in alignment with the associated order item line 36. The lower portion of the sales order card 32 is provided with a similar printing area upon which figures corresponding to the total number of items ordered or purchased, the applicable taxes on the items ordered, and the total purchase price to be paid by the customer are printed. It will be understood that the described sales order card 32 is exemplary of the type of card or bill with which the transport apparatus 20 may be used, and that other similar cards will find ready application with the transport apparatus 20, it being desirable that the cards be provided with index registration indicia, a program area to receive selected indicia thereon by an operator, and a printing area upon which indicia is to be printed.

Figure 3:
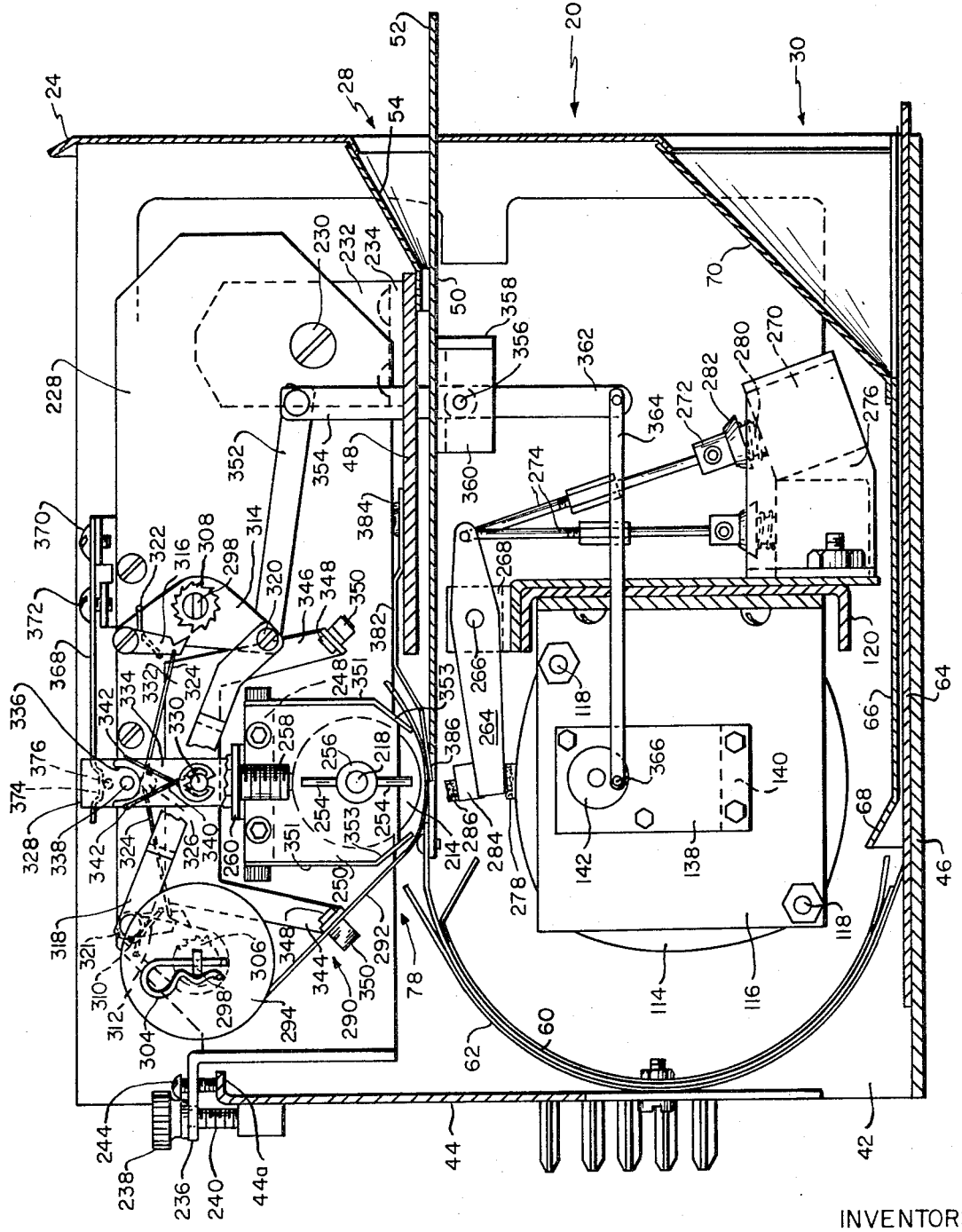
FIG. 3 is a side sectional view taken generally along the line 3—3 of FIG. 5 and illustrating the card guide path and printing mechanism means, the card drive wheel being removed.
Figure 4:
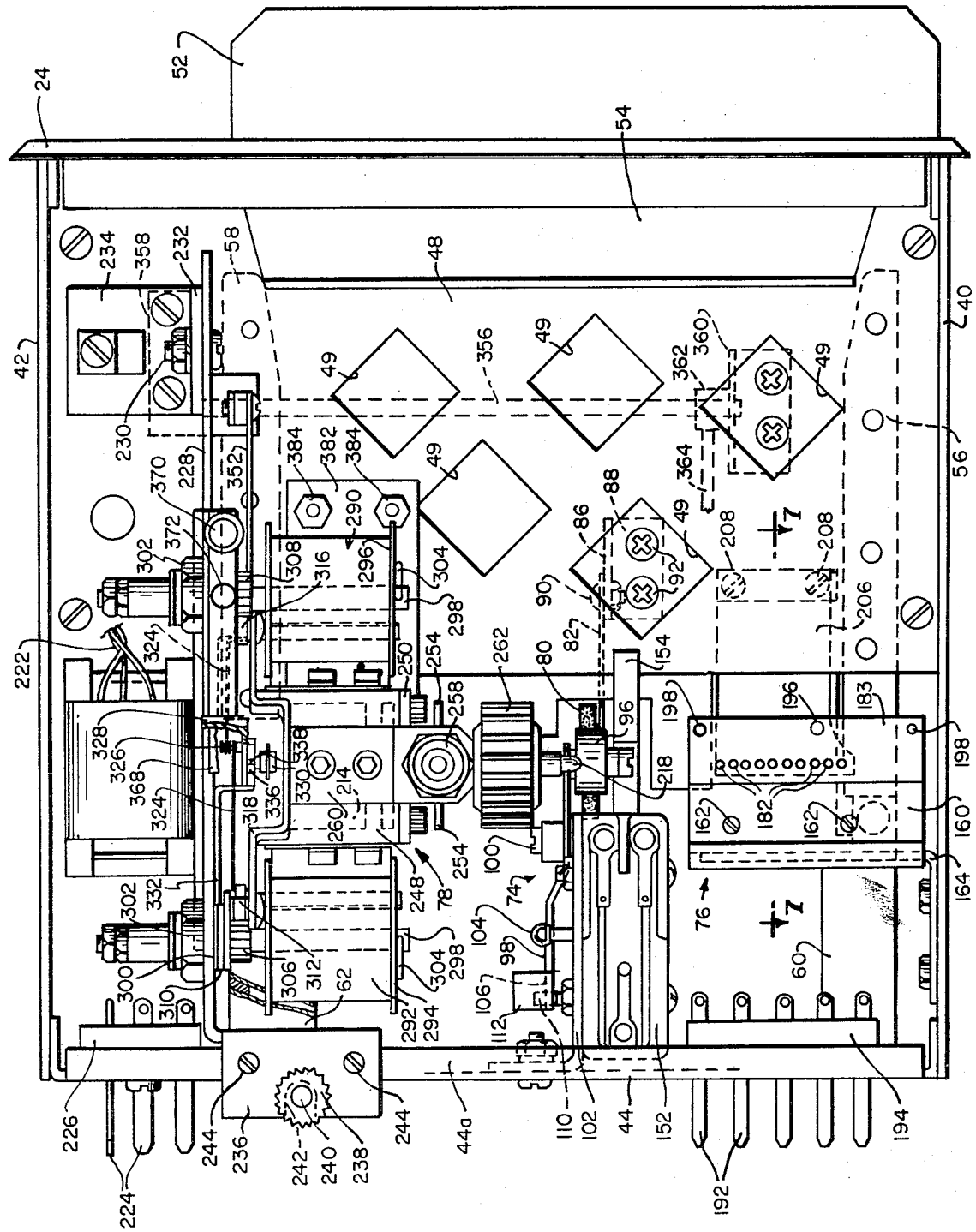
FIG. 4 is a top view of the transport apparatus of FIG. 1 with the casing removed to show certain of the elements.

Referring to FIGS. 3 and 4, the chassis means 22 includes a frame structure comprising opposed spaced side plates 40 and 42 which are suitably secured to the front plate 24 in normal relation thereto. A rear cross plate 44 is secured to and between the rearward portions of the spaced side plates 40 and 42, and a bottom plate 46 is secured to the lower edges of the side plates 40, 42 as well as to the front plate 24. The frame structure receives and supports the casing 26 thereover to enclose the apparatus components when in assembled relation. It will be understood that the plates 24, 40, 42, 44 and 46 defining the chassis frame may have portions cut away as desired to provide access for construction and maintenance, and provide sufficient ventilation for heat which may be developed during operation.

As noted, the chassis means 22 includes means defining a guide path through which a card 32 is transported during operation of the transport apparatus 20. The guide path adjacent the card entrance opening 28 is defined by vertically spaced horizontal cross plates 48 and 50 (with the plate 48 having openings 49 therethrough) which are suitably secured to and between the spaced vertical side plates 40 and 42. A forward portion 52 of the cross plate 50 extends outwardly from the front plate 24 and serves to engage and guide the forward edge of a card 32 as it is introduced into the opening 28. An inclined guide plate 54 is suitably fixedly positioned between the front plate 24 and the forward edge of the upper cross plate 48 to further assist in guiding the forward edge of a card 32 into the card guide path. The upper and lower cross plates 48 and 50 are maintained in vertical spaced relation by elongated spacer bars 56 and 58 having a vertical thickness slightly greater than the thickness of a card 32 to be transported through the transport apparatus 20 and laterally spaced a distance slightly greater than the lateral width of a card 32. As will become more apparent hereinbelow, the spacer bar 56 serves as a positive registration bar to about the corresponding edge of a card 32 as it is transported through the transport mechanism, and provides a fixed reference for the cards 32 relative to the remaining components of the transport apparatus 20.

A pair of laterally spaced card return guides 60 and 62 comprising generally arcuately shaped spaced guide plates are suitably secured to the rear cross plate 44 and serve to guide a card 32 from the portion of the guide path defined by the cross plates 48 and 50 to an exit guide path portion defined by transverse cross plates 64 and 66 which are suitably secured in vertically spaced relation to the bottom plate 46 of the chassis means 22. The upper cross plate 66 is provided with an upwardly inclined rearward portion 68 to assist in receiving and guiding a card 32 from the card return guides 60 and 62, while the forward edge of the plate 66 engages an upwardly inclined plate 70 which cooperates with the lower transverse plate 64 to define the exit opening 30 in the chassis means 22.

The transport apparatus 20 includes means indicated generally at 74, for effecting selective movement of a card 32 through the guide path, reader head means, indicated generally at 76, for scanning the index registration indicia markings 34 and the program area 38 on the card 32 and establishing output signals responsive to the registration indicia and programmed data on the program area 38 of the card 32, and printing means, indicated generally at 78, for printing indicia on the printing area 40 of the card 32 responsive to signals from the reader head means 76.

Figure 5:
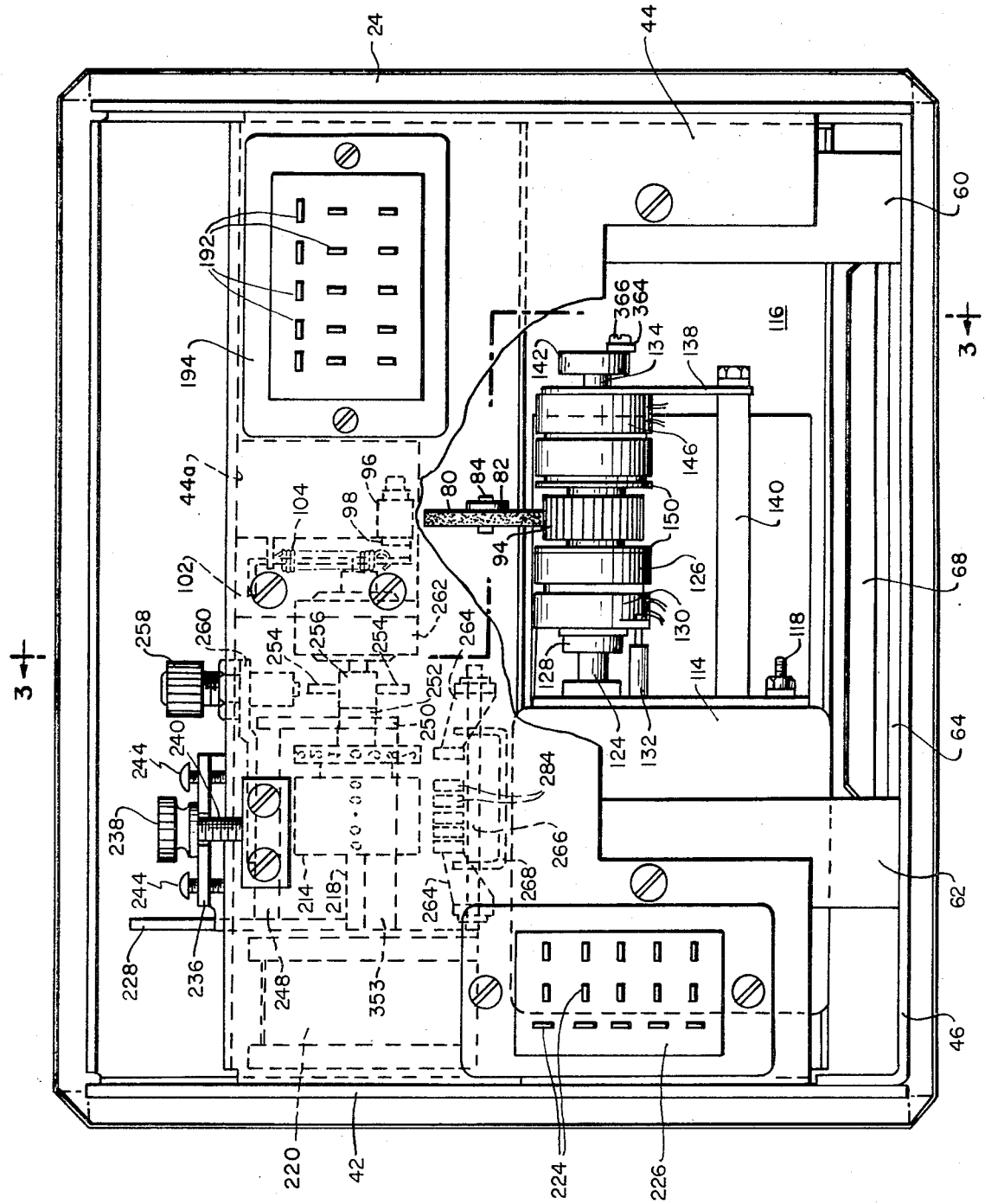
FIG. 5 is a rear end view of the transport apparatus of FIG. 1 with the chassis frame partially broken away to show the drive-clutch mechanism.

Referring to FIGS. 4 and 5, taken in conjunction with FIG. 6, the means 74 for effecting selective movement of a card 32 through the guide path defined by the chassis means 22 includes a drive wheel or roller 80 rotatably supported on the rearward end of a support arm 82 through a support shaft 84 secured in normal relation to the support arm 82. The support arm 82 is pivotally secured to a depending leg portion 86 of a support bracket 88 through a pivot pin 90 for movement in a generally vertical plane, the support bracket 88 being secured to the lower surface of the cross plate 50 through screws 92. The outer peripheral surface of the roller 80 is provided with a friction surface such as rubber to engage the serrated peripheral surface of a drive wheel 94. As will become more apparent below, the drive wheel 80 is supported in driven relation with the drive wheel 94 so that the uppermost peripheral surface of wheel 80 is positioned slightly above the plane of the upper surface of plate 50.

A pressure roller 96 is rotatably supported on the forward end of a support arm 98 which in turn is supported for pivotal movement in a generally vertical plane about a pivot pin 100. The pivot pin 100 is secured in normal relation to a vertical support plate 102 which is suitably secured to the rearward cross plate 44. The support arm 98 is urged in a counterclockwise direction about the pivot pin 100, considered in FIG. 6, by a coil tension spring 104 in a manner to normally urge the pressure roller 96 against the peripheral surface of the drive wheel 80, as shown in dash lines in FIG. 6. In this manner, a card 32 inserted into the guide path defined by cross plates 48 and 50 will be received between the drive wheel 80 and pressure roller 96 in driven relation therewith.

A retainer arm 106 is pivotally connected to the support arm 98 opposite the pivot pin 100 from the pressure roller 96 and includes a retaining notch 108 adapted to receive a stop pin 110 therein for selectively maintaining the pressure roller 96 spaced upwardly from the drive wheel 80. Movement of the retainer arm 106 through a thumb tab 112 thereon to a position releasing the stop pin 110 from the retaining notch 108 serves to effect movement of the pressure roller 96 toward the drive wheel 80, or into engagement with the upper surface of a card 32 when disposed between the pressure roller 96 and drive wheel 80.

Noting FIG. 4, the drive wheel 80 is canted, when considering a vertical plane through the drive wheel 80 relative to a vertical plane normal to the axis of the drive wheel 94, in a direction to urge a card 32 against the registration spaced bar 56 during movement of a card 32 through the guide path.

Referring to FIGS. 3 and 5, taken in conjunction with FIG. 9, the drive wheel 94 is adapted to be selectively rotatability driven for effecting rotational movement of the card drive wheel 80 through an electric motor 114. The motor 114 is supported by a support bracket 116 through mounting bolts 118, the support bracket 116 being secured to a cross bracket 120 suitably fixed between the spaced side frame plates 40, 42. Motor 114 includes a motor drive shaft 124 received through an appropriate opening in the support bracket 116 and extending outwardly therefrom. An annular electric clutch rotor 126 is suitably received over the outer end of the motor drive shaft 124 and secured in driving relation therewith by a retaining collar and set screw assembly 128. An annular field assembly 130 is concentrically supported by the clutch rotor 126 in sliding rotation thereon and is maintained in generally fixed angular position relative to the support bracket 116 by a stop pin 132 secured to the support bracket 116. A drive shaft extension 134 is secured in rotating driven relation to the annular rotor 126 through a knurled end portion 136 received within an axial bore in the annular rotor 126, the shaft 134 being in axial alignment with the motor drive shaft 124 and extending longitudinally outwardly through a vertical bracket 138 secured to the support bracket 116 by a support block 140. The outermost end of the drive shaft extension 134 has a crank disc 142 fixedly secured thereto for rotation with the motor drive shaft 124. The drive wheel 94 is slidably rotatably supported on the drive shaft extension 134 through a suitable annular bushing 144. An electric braking stator 146 is fixedly secured to the vertical bracket 138 and has an axially disposed annular bushing 148 which receives the drive shaft extension 134 therethrough for sliding rotational movement within the braking stator 146. A pair of annular armature pieces 150 are disposed about shaft 134 between the clutch rotor 126 and drive wheel 94, and between the braking stator 146 and drive wheel 94. The field assembly 130 and braking stator 146 are connected in circuit (not shown) to receive energizing signals such that when the field assembly 130 is energized, the drive wheel 94 is caused to rotate with the motor drive shaft 124, and when the braking stator 146 is energized and the field assembly 130 deenergized, the drive wheel 94 is braked in a manner to allow continued rotation of the motor drive shaft 124.

The drive motor 114 is adapted to be energized to effect clockwise rotational movement of the drive wheel 80, as considered in FIG. 6, when a card 32 is inserted into the guide path. To effect such energizing of motor 114, an off-on switch 152 (FIGS. 4 and 6) having a switch contact actuating arm 154 is supported by the support plate 102 such that a forward end of the actuating arm 154 is positioned generally adjacent the rearward edge portion of the cross plates 48, 50. The switch actuating arm 154 is urged to a downward "switch open" position as illustrated in FIG. 6 by spring means (not shown). The switch arm 154 is moved upwardly upon engagement with the forward edge of a card 32 inserted into the transport apparatus 20 to close the switch 152 which is connected in a power supply circuit to the electric motor 114 as will be described more fully below. Closing of the switch 152 also serves to effect initial energizing of the field assembly 130 whereby to effect driving rotation of the drive wheels 94 and 80.

As noted above, the reader head means 76 serves to scan the index registration indicia 34 and program area 38 on a card 32 and establish selective output signals as the card 32 is transported through the transport apparatus 20. With reference to FIG. 4, taken in conjunction with FIGS. 7 and 8, the reader head means 76 includes an elongated scanner head block 158 supported with its longitudinal axis disposed in transverse relation to the direction of travel of a card 32 through the transport apparatus 20. To this end, the scanner head block 158 has an upper planar surface 159 secured to a support bracket 160 as by screw 162, the suport bracket 160 being secured to the inwardly directed leg portion of an L-shaped support bracket 164 affixed to the side plate 40. The configuration of the support brackets 160 and 164 are such that a bottom planar surface 166 of the scanner head block 158 is disposed in a horizontal plane generally coincident with the lower surface of the guide plate 48.

The scanner head block 158 has ten through-bores 168 therethrough, the axes of the bores 168 being parallel and equidistantly spaced longitudinally of the scanner head block 158 in a plane normal to the plane of the lower surface 166 of the block 158. The intersection of the bores 168 with the surface 166 of the block 158 defines a scanning position for the transport apparatus 20 generally transverse to the path of travel of a card 32 through the apparatus 20. The scanner head block 158 further has a longitudinally extending bore 170 therethrough having its axis parallel to the plane of the lower surface 166 of the scanner head block 158 and parallel to the plane containing the axes of the bores 168. The bore 170 serves to receive a conventional elongated scanner lamp 172 supported through annular grommets 173. A plurality of angularly disposed passages 174, each corresponding to one of the ten through-bores 168, are provided in the scanner head block 158 and provide light beam communication between the lamp 172 and each of the bores 168. The axes of passages 174 are angularly inclined at an angle alpha of approximately about 30° relative to the plane of the lower surface 166 of the block 158 and intersect the associated through-bores 168 in the plane of the lower surface 166 of the scanner head block 158. An elongated photocell retaining block 178 is suitably secured to the upper surface 159 of the scanning block 158, the support bracket 160 having an appropriate rectangular opening 161 therethrough to receive the photocell retaining block 178. The retaining block 178 has a plurality of stepped bores 180 therethrough adapted for overlying alignment with the bores 168 in the scanner head block 158. Each of the bores 180 receives the lower cylindrical end portion of a phototransistor 182 such that each of the phototransistors 182 is axially aligned with a corresponding bore 168 in the scanner head block 158. The phototransistors 182 are supported by a support plate comprising a conducting plate 183 secured to the upper surface of a non-conducting mounting board 184 which is attached to the upper surface of the retaining block 178 by screws 186. The outer cylindrical surface of each of the phototransistors 182 is fixedly conductively connected to the conducting plate 183 but is spaced from the peripheral surfaces defining the corresponding phototransistor receiving bores 187 in the mounting board 184 and the bores 180 in retaining block 178. Each of the phototransistors 182 has a conductor 190 secured to its upper end to electrically connect the phototransistor 182 to associated connector terminals 192 on a conventional plug-in connector plate 194 supported on the rear cross plate 44. The conducting plate 183 serves as a common voltage reference conductor for the phototransistors 182 and has a connector 196 adapted to be connected to one of the connector terminals 192. A pair of connecting terminals 198 are suitably secured to the mounting board 184 for connecting two of the connector terminals 192 on the coupler plate 194 with the ends of the scanner lamp 172 for energizing the lamp in a conventional manner.

While the reader head means 76 has been illustrated as having a single elongated scanner lamp 172 disposed within a bore 170 etxending longitudinally in the block 158, the lamp 172 may be replaced with a plurality of smaller scanner lamps corresponding to the number of phototransistors 182. In the latter embodiment, each of the passages 174 may be axially extended and adapted to coaxially support a separate scanner lamp providing light beam communication with the associated bore 168. In this alternative reader head means embodiment the light passages 174 would be maintained at approximately their above described thirty degree angular relationship (alpha) to the plane of the scanner block lower surface 166. Still further, the separate scanner lamps and phototransistors 182 could be interchanged such that the scanner lamps are supported axially above or within the bores 168, and the phototransistors 182 are supported in coaxial communication with the passages 174.

The reader head means 76 further includes a card spacer shim 200 secured to the lower surface 166 of the scanner head block 158 to provide a uniform spacing between the scanner block 158 and the upper adjacent surface of a card 32 as it passes the scanning position of the transport apparatus 20. The spacer shim 200 is provided with a plurality of rearwardly extending fingers 202 defining openings therebetween, the fingers 202 being disposed between the openings of bores 168 in the scanner block surface 166. The spacing of a card 32 from the scanner block surface 166 as the card 32 passes the scanning position serves to minimize contamination and insure a reflection of light from each of the said passages 174 into the associated bore 168 for impingement on the associated phototransistor 182. A forward portion 204 of the spacer shim 200 is included upwardly to assist in guiding the cards 32 in underlying relation past the scanner head block 158. A flat spring member 206 is secured to the underside of the transverse guide plate 50, as through screws 208, and has a rearward end portion adapted to urge the cards 32 against the finger portions 202 of the spacer shim 200 as the cards 32 pass in underlying relation to the scanner head block 158 during operation.

The scanning lamp 172 and phototransistors 182 are connected to suitable electronic circuitry (not shown) through the terminal connectors 192 such that the phototransistors 182 establish output signals through the associated circuitry dependent upon the reflection of light from the scanner lamp 172 as reflected upwardly through the opening bores 168 when a card 32 is moved past the scanner head block 158 in underlying engaging relation with the spacer shim 200. The bore 168 and associated phototransistor 182 closest to the spacer bar 56 between the guide path defining cross plates 48 and 50 are disposed to overlie the registration indicia markings 34 on a card 32 as it passes through the guide path of the transport apparatus 20. The remaining nine phototransistors 182 and their associated bores 168 in the scanner head block 158 are positioned to overlie the quantity indicating digits 1–9 in the program area 38 associated with each of the orderable item lines 36 on the card 32. The phototransistor 182 associated with the registration indicia 34 on the card 32 is connected in circuit to provide an indicating output signal each time one of the registration indicia markings 34 passes thereunder, thereby producing a signal responsive to the position of the card 32 relative to the scanning position of block 158. The remaining nine phototransistors 182 overlying the program area 38 on the card 32 are each adapted to provide an indicating output signal through its associated circuitry when the light beam from the sensor lamp 172 reflected off the card 32 into the corresponding bore 168 is varied as would result from an operator placing a pencil marking to cover one of the digits in the program area 38 aligned with each item line 36.

While the electronic circuitry, per se, to which the phototransistors 182 of the reader head means 76, the switch 152 and the motor 114 are connected for effecting selected operation of the various electrically energized elements of the transport apparatus 20, forms no part of the present invention, a detailed description of suitable electronic circuitry which may be readily used in conjunction with the present invention is set forth in co-pending application of Raymond J. Bukowski and Frederick S. Erst, Ser. No. 14,605 filed Feb. 26, 1970, and assigned to the assignee of the present invention.

Figure 10:
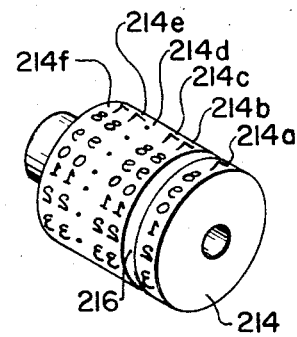
FIG. 10 is a perspective view of the printer wheel used in the transport apparatus.

As a card 32 is caused to be moved through the guide path of the transport apparatus 20, the printing means 78 is caused to effect selective printing of printing characters on the printing area 40 of the card 32 in response to selected indicating output signals from the reader head means 76. With reference to FIGS. 3 and 4, taken in conjunction with FIGS. 5 and 10, the printing means 78 includes a cylindrical printing wheel 214 supported for rotation about an axis generally transverse to the direction of card travel through the transport apparatus 20. The printing wheel 214 is made of a polycarbonate material to provide minimum inertia and maximum rotational speed. Noting FIG. 10, the printing wheel 214 has a plurality of raised printing characters equidistantly circumferentially spaced about the peripheral surface thereof the printing characters being illustrated as comprising annular rows of numerical printing characters arranged in two sets of digits 0 to 9 disposed in seriation order about the full circumferential extent of each row.

The annular rows of printing characters are arranged such that the printing characters comprise longitudinal rows of identical printing characters. As will become more apparent hereinbelow, the printing wheel 214 is selectively rotated to position longitudinal rows of printing characters adjacent the card guide path defined by plates 48 and 50 preparatory to printing on a card 32, such printing position being hereinafter termed the printing line of the transport apparatus 20. A first annular row of printing characters 214a is disposed adjacent one end of the printing wheel 214 so as to overly the column entitled "QTY" on the printing area 40 of a sales order card 32 as the card 32 is transported through the transport apparatus 20. Second and third annular rows of numerical printing characters 214b and 214c are spaced from the annular row of printing characters 214a by an annular groove 216 in the printing wheel 214 and are adapted to selectively print dollar digits in the "PRICE" column on the printing area 40 of a sales order card 32 during operation. An annular row of decimal points 214d and two rows of numerical printing characters 214e and 214f are further provided on the printing wheel 214 to effect the printing of cents digits in the "PRICE" column of the card 32.

The printing wheel 214 is supported on an axially disposed shaft 218 comprising the drive shaft of a suitable stepping electric motor 220. The motor 220 is electrically selectively connected through conductors 222 to terminal connectors 224 on a connecting plate 226 secured to the rear cross plate 44 of the chassis 22. The connecting plate 226 is similar to the connecting plate 194 and provides a means for conveniently connecting the motor 220 to associated electronic circuitry (not shown) to effect energizing of the motor 220. An example of suitable circuit means for association with the motor 220 is disclosed in the above referenced copending application of Raymond J. Bukowski and Frederick S. Erst, Ser. No. 14,605. The motor 220 is secured to and supported by a support plate 228 which is supported for pivotal movement in a generally vertical plane by a pivot pin 230 fixed to the upstanding leg portion 232 of a support bracket 234. The support bracket 234 is suitably secured to the upper surface of the cross plate 48.

The support plate 228 has a rearwardly extending planar end portion 236 adapted for locking engagement with a locking nut 238 threadedly received on a screw 240 secured to the rear cross plate 44. For this purpose, the end portion 236 of the support plate 228 is provided with a notch 242 adapted to receive the screw 240 therein while allowing upward pivotal movement of the support plate 228 when the locking nut 238 is removed from the locking screw 240. A pair of adjustable spacing screws 244 are threadedly received within appropriate threaded holes in the end portion 236 of the support plate 228 for engagement with a horizontally disposed lip portion 44a on the cross plate 44 when the support plate 240 is in its normal downward position. The adjustable screws 244 provide means for positioning the printing wheel 214 relative to the card guide path defined by the cross plates 48 and 50. With the support plate 228 being pivotally supported as described, it can be seen that the support plate 228 can be pivoted upwardly in a generally vertical plane about the pivot pin 230 upon release of the locknut 238 whereby to raise all of the elements supported by the support plate 228.

A support block 248 is suitably secured to the support plate 228 in normal relation thereto and supports a downwardly depending plate member 250 having an annular bearing 252 therein to receive and support the outer end of the motor drive shaft 218. The motor drive shaft 218 extends outwardly from the bearing 252 and supports a pair of axially aligned diametrically opposed radial arms 254 of equal length and suitably secured to the drive shaft 218 through an annular sleeve 256. A magnetic pick-up 258 is supported by a support bracket 260 secured to the upper surface of the support block 248 such that the axis of the magnetic pick-up 258 intersects the axis of the motor shaft 218 and lies in a plane containing the axes of the radially opposed arms 254, the lowermost end of the magnetic pick-up 258 being spaced from the outermost ends of the arms 254 as they rotate past the magnetic pick-up 258. The magnetic pick-up 258 is adapted to provide an output signal each time one of the radial arms 254 passes below the magnetic pick-up 258 which signals serve to indicate the relative rotational position of the printing wheel 214 during rotation to position selective printing characters on the printing line. Preferably, the radially extending arms 254 are angularly positioned relative to the annular rows of printing numerals on the printing wheel 214 such that the outer end of each of the arms 254 is aligned between rows of "zero" and "nine" printing characters. In this manner, an output reference signal is produced by the magnetic pick-up 258 each time a longitudinal row of zero printing characters is disposed on the printing line of the transport apparatus 20. These zero position reference signals are fed to associated electronic circuitry and serve as a basic reference for determining the duration of energizing signal to the motor 220 for effecting rotational movement of the printing wheel 214 to position desired printing characters on the printing line. It will be understood that by providing two similar sets of numerical printing characters in each annular row of printing characters on the printing wheel 214, any one of the numerical digits from zero to nine may be positioned on the printing line of the machine by moving the printing wheel 214 through no more than one-half revolution.

An inertial damper 262 of the rotary vane dash pot type is secured on the outermost end of the motor drive shaft 218 and serves to damp oscillations of the motor 220 in the process of stopping the printing wheel 214.

Referring to FIGS. 3 and 5, taken in conjunction with FIG. 11, a plurality of printing hammers 264, each corresponding to one of the rows of printing characters 214a–f on the printing wheel 214, are pivotally supported in underlying relation to the printing wheel 214 and adapted for selective engagement with the bottom surface of the card 32 adjacent the printing line of the transport apparatus 20 to urge the engaged portions of the card 32 toward the printing wheel 214. Each of the printing hammers 264 is pivotally supported on a support shaft 266 which is supported in transverse relation to the direction of card travel by a U-shaped support bracket 268 secured to the cross bracket 120. Each of the printing hammers 264 is provided with means for effecting pivotal movement thereof, which means includes an actuating solenoid 270 having a sliding plunger or piston 272 operable therewith in a known manner. The upper end of each piston 272 is connected to an associated printing hammer 264 through an adjustable linkage 274, the upper ends of the adjustable linkages 274 being suitably secured to the ends of the associated printing hammers 264 opposite the pivotal axis 266 from the card engaging portions of the hammers 264. The actuating solenoids 270 are supported in a fixed relation on the cross bracket 116 by a support bracket 276 such that the adjustable linkages 274 are of generally equal length.

Each of the printing hammers 264 has an upwardly directed portion 284 having a printing pad 286 suitably secured thereon to engage the bottom surface of a card 32 and urge the portion of the card 32 engaged by the pad 286 toward the printing wheel 214.

An elongated resilient pad 278, such as a felt pad is secured to the upper surface of the drive motor 114 in underlying relation to the rearwardmost ends of the printing hammers 264 and serves as a limit stop for the printing hammer 264 when pivoted in a counterclockwise direction, as considered in FIG. 3. The adjustable linkages 274 and solenoid pistons 272 are urged outwardly from their associated solenoid coils 270 by means of coil compression springs 280 disposed about the pistons 272 between the upper surfaces of the solenoid coils 270 and annular retainer rings 282 secured to the upper cylindrical portions of the pistons 272 through press fits. The linkages 274 are adjusted in length such that the printing pads 286 on the print hammers 264 are driven toward their printing positions by the solenoid pistons 272 until just short of making contact with the under surface of a card 32 disposed between the print hammers 264 and the printing wheel 214. Slack motion in the joints or connections at either end of the linkages 274 is such that further travel of the print hammers 264 into engagement with a card 32 is due to inertia of the hammers 264 in motion and not due to further movement of the solenoid pistons 272. Such inertia action of the print hammers 264 has been found to produce sharp printing images on the cards 32 during operation. The solenoids 270 are connected in a suitable electric circuit (not shown) such that the individual solenoids 270 are selectively energized responsive to indicating signals from the phototransistors 182 scanning the program area 38 of a card 32 during transport through the apparatus 20. When energized, the solenoids 270 effect retraction of their associated pistons 272 with a corresponding downward movement of the adjustable linkages 274 to effect clockwise pivotal movement of the operating hammers 264, as considered in FIG. 3. An example of a suitable electric circuit for use with the solenoids 270 is disclosed in the referenced copending application, Ser. No. 14,605.

An ink ribbon supply and advance means 290 is supported by the support plate 228 and includes a conventional flat elongated ink ribbon 292 having its opposite ends secured to conventional reels 294 and 296. Each of the ribbon reels 294 and 296 serves, alternately, as both a supply and take-up reel. The reels 294 and 296 are supported in positive driven relation on identical parallel support shafts 298 which are rotatably supported in normal relation to the support plate 228 through suitable bushings and retaining nuts 300 and 302, respectively. The reel support shafts 298 have parallel flat surfaces along their lengths receiving the reels 294 and 296 thereon, the reels 294 and 296 being retained on the support shafts 298 by suitable means such as releasable lock pins 304.

Each of the reel support shafts 298 has a ratchet gear 306 and 308, respectively, secured thereon for conjoint rotation with the reel support shafts 298. A radially extending lever 310 is rotatably supported on the support shaft 298 associated with the reel 294 juxtapositioned to the ratchet gear 306 and pivotally supports a pawl 312. A bellcrank lever 314 is rotatably supported on the support shaft 298 associated with the reel 296 juxtapositioned to the ratchet gear 308 and pivotally supports a pawl 316 having a configuration generally similar to pawl 312. A connecting link 318 interconnects the pivotal connection of the pawl 312 on the lever arm 310 to a pivot pin 320 on the bellcrank lever 314 in a manner such that oscillating rocking movement of the bellcrank lever 314 about the pivotal axis of its support shaft 298 effects an equal and opposite angular displacement of the lever 310 about its support shaft 298.

A bias spring 321 is supported by and operatively associated with the pawl 312 and its associated support lever 310 in a manner to urge the pawl 312 in a clockwise direction relative to the lever 310, when considered in FIG. 3. Similarly, a bias spring 322 is supported by and operatively associated with the pawl 316 and its associated support lever 314 in a manner to urge the pawl 316 in a counterclockwise direction relative to the support lever 314, when considered in FIG. 3.

A pair of connecting links 324 are connected, respectively, to the lower depending end portions of the pawls 312 and 316 and have their opposite end portions connected through limited lost motion connections to an outwardly directed connecting pin 326 secured in normal relation to an upstanding pawl return lever 328. The pawl return lever 328 is supported for pivotal movement in a vertical plane about a stub shaft 330 which is suitably secured in normal relation to the support plate 228. The two connecting links 324 are of equal length and such that when the return lever 328 is in an intermediate generally vertical position as illustrated in FIG. 3, the connecting links 324 maintain the lower ratchet gear engaging ends of the pawls 312 and 316 in laterally spaced relation from their associated ratchet gears 306 and 308, respectively.

A ribbon reversing lever 332 having an inverted U-shape is pivotally supported on the stub shaft 330 juxtapositioned to the support plate 228 and has an upstanding arm portion 334 disposed in inward adjacent relation to the pawl return lever 328. The upper end of the upstanding arm portion 334 of the ribbon reversing lever 332 has a semi-circular recess 336 therein to receive a limit pin 338 secured to the inner surface of the upstanding pawl return lever 328 in normal relation thereto. With the limit pin 338 received within the semi-circular recess 336 and with both the pawl return lever 328 and reversing lever arm portion 334 being pivotal about the stub shaft 330, it can be seen that pivotal movement of the lever arm portion 334 will effect a corresponding pivotal movement of the return lever 328 when the arm 334 is moved an extent sufficient to engage limit pin 338. A torsion spring 340 is supported by the stub shaft 330 and includes upper end portions 342 adapted to engage the opposite edge surfaces of both the upstanding arm portion 334 of reversing lever 332 and the pawl return lever 328 to urge the pawl return lever 328 to a superimposed centered position relative to the upstanding arm 334.

The ribbon reversing lever 332 includes downwardly directed leg portions 344 and 346 each of which has spaced ribbon guide fingers 348 and 350 secured in normal relation thereto. The spaced guide fingers 348 and 350 are disposed in generally transverse relation to the card guide path of the transport apparatus 20 and are adapted to receive the ink ribbon 292 in guiding relation therebetween when the ribbon 292 is in operative position underlying the printing wheel 214. A depending ribbon guide 351 (FIG. 3) is suitably secured to each longitudinal edge of the support block 248 and has a lower inclined portion 353 adapted to partially underlie the printing wheel 214. The inclined portions 353 of the depending ribbon guides 351 serve to guide the ink ribbon 292 in light contacting relation past the printing wheel 214 during translation of the ink ribbon 292 between the reels 294 and 296. The side surfaces of the ribbon guides 351 serve to limit the extent of rotational movement of the ribbon reversing lever 332 through abutment with the ribbon guide fingers 348 on the depending leg portions 344 and 346 of the ribbon reversing lever 332.

As noted above, when the pawl return lever 328 is disposed in a neutral generally vertical position as shown in FIG. 3, the ratchet engaging lower ends of the pawls 312 and 316 are laterally spaced from their associated ratchet gears 306 and 308, respectively. During normal operation, however, the return lever 328 is disposed in a position wherein one of the pawls 312 or 316 operatively engages its associated ratchet gear 306 or 308. For example, during assembly the pawl return lever 328 may be manually moved angularly about the stub shaft 330 in a clockwise direction, as considered in FIG. 3. In so moving the pawl return lever 328, the rack engaging pawl 312 will be withdrawn a greater distance from its associated ratchet gear 306 while the ratchet engaging pawl 316 will be moved to a position engaging its associated ratchet gear 308. Thereafter, when the bellcrank lever 314 is caused to oscillate about its pivot axis 298, the pawl 316 will step the ratchet gear 308 and associated reel support shaft 298 in a counterclockwise direction in a known manner. The ink ribbon reel 296 will thereupon take up the ink ribbon 292 with a simultaneous let-off of the ink ribbon 292 by the reel 294 which is freely rotatable with its associated support shaft 298 due to disengagement of the pawl 312 with the ratchet gear 306.

The ink ribbon supply and advance means 290 includes actuating means for effecting rocking oscillating movement of the bellcrank lever 314 about its pivot axis 298 to effect advance of the ribbon 292. The actuating means includes a connecting link 352 pivotally connected to the connecting pin 320 on the bellcrank lever 314 and an actuating arm 354. The arm 354 is fixedly secured on a cross shaft 356 which is rotatably supported in transverse underlying relation to the cross plate 50 through depending support brackets 358 and 360, it being understood that the actuating arm 354 is received through an appropriate opening in the cross plate 50. A depending lever 362 is fixedly secured to the cross shaft 356 laterally spaced from the actuating arm 354 and has its lower end pivotally connected to an elongated connecting link 364. The end of the connecting link 364 opposite its pivotal connection to the lever 362 is pivotally connected to the aforedescribed crank disc 142 through a pivot pin 366 secured in normal relation to the outer surface of the crank disc 142. The pivot pin 366 is secured to the disc 142 in the offset relation to the axis of rotation of the disc 142 such that when the crank disc 142 is rotated through energizing of the drive motor 114, the connecting link 364 will be caused to reciprocate in a direction generally longitudinally thereof with a resulting angular reciprocation of the lever 362, arm 354 and the bellcrank levers 314 and 310.

Means are provided to reverse the direction of ink ribbon travel as the ink ribbon 292 is moved from the reel 294 to the reel 296 through the ribbon guide fingers 348, 350 of the ribbon reversing lever 332, as above described. To this end, an abutment means (not shown) such as a small lightweight projection is secured to the ink ribbon 292 generally adjacent its end connected to reel 294 such that as the ribbon 292 is substantially unrolled from reel 294 the projection will engage the guide fingers 348 and 350 on the depending leg portion 344 of the ribbon reversing lever 332 and effect a counterclockwise rotation of the ribbon reversing lever 332 about stub shaft 330, as considered in FIG. 3. Counterclockwise rotation of the reversing lever 332 effects a similar rotation of the upstanding arm portion 334 to cause the edge surface defining the recess 336 to engage the limit pin 338 on the pawl return lever 328 and impart a corresponding counterclockwise rotation to the pawl return lever 328. Such movement of the pawl return lever 328 will cause the ratchet engaging end of the pawl 316 to be released from operative engagement with its associated ratchet 308 and allow the bias spring 320 to urge the pawl 312 into operative engagement with its associated ratchet gear 306. In this manner, continued reciprocation of the bellcrank lever 314 will cause the pawl 312 to operatively engage and rotate the associated ratchet 306 in a clockwise direction, considered in FIG. 3, while allowing free clockwise rotation of the reel 296 and its associated support shaft 298 to release the ink ribbon 292 from reel 296. A similar second abutment means is provided on the ink ribbon 292 generally adjacent the end secured to the reel 296 such that when the ink ribbon 292 has been substantially unrolled from reel 296, the second abutment projection will engage the guide fingers 348, 350 of the depending leg portion 346 of the ribbon reverse lever 332 and effect clockwise rotation of the reverse lever 332 about the stub shaft 330. Such clockwise rotation of the reverse lever 332 effects a similar rotation of the pawl return lever 328 to release pawl 312 and allow operative engagement of pawl 316 in a manner similar to the above described reversing process.

An elongated flat detent spring 368 is secured to the upper portion of the support plate 228 and provides a means for releasably maintaining the pawl return lever 328 in either of its operating positions. The detent spring 368 is secured to plate 228 through screws 370 and 372, the screw 372 providing a tensioning adjustment means for the spring 368. The detent spring 368 overlies and engages an outwardly directed pin 376 secured to the outer surface of the pawl return lever 328 in normal relation thereto. The detent spring 368 has a depending projection 374 which defines detent ridges with the adjacent portions of the spring 368 to assist in maintaining the pawl return pin 376 on either side of the projection 374 in either of its operative positions. Preferably the surface of the detent spring 368 engaging the pin 376 is provided with a suitable coating, such as Teflon, to decrease friction engagement surface with the pin 376.

With reference to FIG. 3, taken in conjunction with FIG. 12, a spacer member 382 is secured to the upper surface of the cross plate 48 by screws 384 and has a rearward generally downwardly inclined end portion 386 adapted to underlie the printing wheel 214. The rearward end 386 of the spacer member 382 has a plurality of longitudinally extending slots 388 therein which serve to define resilient fingers between the slots 388. In assembly, rearward edges 390 of the spacer member fingers are positioned slightly forwardly of the printing line of the transport apparatus 20 such that when the printing pads 286 on the printing hammers 264 are caused to engage a card 32 during printing, the finger portions of the spacer member 382 overlying the unactuated printing hammers 264 will resist upward movement of the corresponding portions of the card 32 into engagement with the ink ribbon 292 and prevent "ghosts" from appearing on the card 32 during printing.

Having thus described the elements comprising the transport apparatus 20, its operation will now be briefly described. For purposes of illustration, it will be assumed that an operator such as a sales clerk or the like has entered certain program indicia on the program area 38 of a sales order card 32, the programmed indicia comprising pencil marks covering one of the digits 1–9 corresponding to each item line 36 on the card 32 to indicate the quantity of each item desired. The operator then inserts the programmed card 32 into the card receiving entrance 28 in the transport apparatus 20 and manually forwards the card 32 until the forward edge thereof engages a switch actuating arm 154 of the starting switch 152. As noted, the switch 152 is connected in circuit to the drive motor 114 such that when the card 32 engages the switch actuating arm 154, the drive motor 114 is energized. Simultaneously with energizing the drive motor 114, the circuit means coupled to the switch 152 energizes the field assembly 130 of the annular clutch rotor 126 to effect driving rotation of the serrated drive wheel 94. Rotation of the drive wheel 94 effects rotation of the drive wheel 80 which cooperates with the pressure roller 96 to cause forward movement of the card 32 through the guide path. As the card 32 is moved through the guide path, the phototransistor 182 overlying the index registration markings 34 on the left edge of the card 32, as considered in FIG. 2, transmits an indicating signal responsive to the passage of each of the markings 34 below such phototransistor 182. The indicating signals from the phototransistor 182 overlying the index registration markings 34 on the card 32 are transmitted to electronic circuitry, such as disclosed in the above referenced copending application, Ser. No. 14,605, which is adapted to count the number of indicating signals so received and produce a separate line count signal for each of the index registration markings 34.

As previously described, each of the phototransistors 182 overlying the program area 38 on the card 32 is adapted to establish and indicating output signal when a corresponding digit 1–9 on any one of the item lines 36 has a pencil marking thereon. These indicating output signals are transmitted to appropriate electronic circuitry which reads each signal as indicating that certain quantity of a particular item has been ordered. The electronic circuitry associated with the phototransistors 182 overlying the program area 38 of the card 32 is also operatively coupled to the braking stator 146 and field assembly 130 associated with the drive wheel 94. When a programmed marking appears on the program area 38 adjacent one of the item lines 36 of the card 32 and is detected by a corresponding phototransistor 182, a signal from the corresponding phototransistor 182 is effective to deenergize the field assembly 130 and energize the braking stator 146 to brake rotation of the drive wheels 94 and 80 and stop forward travel of the card 32 within the guide path of the transport apparatus 20.

Simultaneously with such stopping of the card 32, the electronic calculating circuitry associated with the phototransistors 182 is adapted to supply control signals to the motor 220 of the printing means 78 for positioning selected of the printing characters disposed about the peripheral surface of the printing wheel 214 on the printing line of the transport apparatus 20. The elecronic circuitry associated with phototransistors 182 is further adapted to effect selective movement of the printing hammers 264 into engagement with the card 32 to effect printing in the "QTY" and "PRICE" columns 40 of the card 32 opposite the item line 36 having the order program mark thereon. In the latter numerical printing operation, the sequence of printing is always that of first printing the lowest digit that will appear in the "QTY" and "PRICE" columns 40 opposite a particular item line 36, then printing the next higher digit, and so on until the toal numerical value indicating both the "QTY" and "PRICE" for the particular item line 36 has been printed. In this manner, the electronic circuitry associated with the phototransistors 182 causes all printing opposite a given item line 36 to be effected in one 0 to 9 numerical sequence movement of the printing wheel 214 such that the printing wheel 214 is rotated through a maximum one-half revolution during numerical printing opposite the given item line 36.

When the drive motor 114 is initially energized through switch 152, the crank disc 142 is caused to rotate with the motor drive shaft 124 to effect rotary reciprocating movement of the bellcrank lever 314 and translational movement of the ink ribbon reels 294 and 296. It will be appreciated that translational movement of the ink ribbon 292 is effected continuously after insertion of a card 32 through the guide path in engagement with the switch actuating arm 154.

As a card 32 is moved through the guide path of the transport apparatus 20, printing on the printing area 40 of the card 32 will be effected whenever the program area 38 corresponding to one of the item lines 36 has program indicia, i.e., a pencil marking, covering one of the numerals thereon. After the electronic calculating circuit has detected a predetermined number of index registration indicia markings 34 on the card 32 corresponding, for example, to the number of orderable item lines 36 on the card 32 plus two lead markings 34, the drive wheels 94 and 80 will be caused to stop whereupon the electronic calculating circuit will automatically total the quantity of items ordered and the total price effect printing of the total quantity and price on the card 32 opposite the appropriate line therefor, move the card 32 to the next line whereon the applicable taxes are printed, and thereafter effect printing of the total price to be charged the customer.

Through the use of the above described transport apparatus 20, the operator or sales clerk need only mark the card 32 with the particular quantity of an orderable item desired, insert the card 32 into the transport apparatus 20, and remove the completed card 32 for presentation to the customer. The operator or sales clerk is not burdened with the task of remembering the prices of particular orderable items nor calculating the sub-total price, the applicable taxes, nor total price to be charged the customer.

While we have described a preferred embodiment of a transport apparatus in accordance with the invention, it will be understood to those skilled in the art that changes and modifications may be made therein without departing from the invention in its broader aspects.

We claim:

1. For use in transporting, reading and printing a sales order card having a plurality of individual index registration indicia printed thereon in a column, a program area with a plurality of transversely-aligned individual program indicia printed thereon in a plurality of rows each row of which is transversely aligned with one of the index registration indicia and upon the program indicia of which instructional markings are made by selectively manually placing light reflective markings thereon, and a printing area to receive printed indicia thereon, the index registration indicia, program area and printing area of the card being selectively aligned to establish a plurality of data lines, apparatus comprising in combination, chassis means including means defining a guide path for the card transported through the apparatus, means supported by said chassis means for engaging the card upon entry into said guide path and effecting movement of the card along said guide path, reader head means supported by said chassis means adejacent said guide path and defining a detecting position, said reader head means including light source means for effecting light impingement upon the index registration indicia and program indicia of the card moving along said guide path, said reader head means further including light sensor means to simultaneously directly detect light reflection from both the index registration indicia and any light reflective markings on the printed program indicia of successive data lines of the card moving along said guide path, printing means supported by said chassis means adjacent said guide path and defining a printing line transversely aligned with said detecting position of said reader head means, and operating means controlled by the detection of light reflection from instrumental markings on the program area of the card for enabling said printing means to effect printing of indicia on the printing area of successive data lines of the card disposed within said guide path adjacent said printing line when instructional markings in the corresponding data lines are detected by said light sensor means.

2. Apparatus as defined in claim 1 wherein said chassis means includes a front face plate, and wherein said means defining said guide path includes guide track means having card receiving and dispensing openings in said face plate.

3. Apparatus as defined in claim 2 wherein said card moving means includes a drive wheel supported to engage a surface of the card generally centrally between the side edges of the card inserted into said guide path, and a pressure roller supported to urge the card against said drive wheel.

4. Apparatus as defined in claim 3 wherein said guide path defining means includes a positive registration bar along one lateral edge portion of the guide path defining means to provide fixed lateral positioning of the card as the card is transported through said guide path, and wherein said drive wheel is canted in a direction to urge the card engaging said drive wheel against said registration bar as the card is transported through said guide path.

5. Apparatus as defined in claim 3 wherein said card moving means includes a drive motor operatively associated with said drive wheel for effecting driving rotational movement thereof, and including drive motor actuating means supported by said chassis means within said guide path, said drive motor actuating means being supported forwardly of said drive wheel for engagement by the card inserted into said guide path for energizing said drive motor to effect movement of the card through the guide path.

6. Apparatus as defined in claim 1 wherein said reader head means includes a scanner block supported in generally transverse relation to the direction of movement of the card through said guide path and directly overlying the index registration indicia and program indicia areas on the card transported through said guide path.

7. Apparatus as defined in claim 1 wherein said reader head means includes a scanner head supported in generally transverse relation to said guide path and having a surface disposed adjacent said guide path, said scanner head having a plurality of scanner openings in said surface adjacent said guide path, said light sensor means comprising a plurality of photocells supported by said scanner head each in light communicating relation with one of said scanner openings, and said light source means comprising photosensor lamp means supported by said scanner head for transmitting photosensor light outwardly through each of said scanner openings for light impingement upon the index registration indicia and program indicia of the card transported through said guide path adjacent said scanner openings.

8. Apparatus as defined in claim 4 including brake means operatively associated with said drive wheel to effect selective stopping of said drive wheel.

9. Apparatus as defined in claim 3 including latch means to releasably maintain said pressure roller above said guide path in position for non-engagement with the card inserted into said guide path.

10. Apparatus as defined in claim 7 including resilient means supported by said chassis means in underlying relation to said surface adjacent said guide path to urge the card toward said surface during movement of the card through said guide path.

11. For use in transporting, reading and printing a sales order card having a plurality of individual index registration indicia printed thereon in a column, a program area with a plurality of transversely-aligned individual program indicia printed thereon in a plurality of rows each row of which is transversely aligned with one of the index registration indicia and upon the program indicia of which instructional markings are made by selectively manually placing light reflective markings thereon, and a printing area to receive printed indicia thereon, the index registration indicia, program area and printing area of the card being selectively aligned to establish a plurality of data lines, apparatus comprising, in combination, chassis means including means defining a guide path for the card transported through the apparatus, means supported by said chassis means for engaging the card upon entry into said guide path and effecting movement of the card along said guide path, reader head means supported by said chassis means adjacent said guide path and defining a detecting position, said reader head means including a scanner head supported in generally transverse relation to said guide path and having a surface disposed adjacent said guide path, said scanner head having a plurality of scanner openings in said surface adjacent said guide path, said reader head means also including light sensor means comprising a plurality of photocells supported by said scanner head each in light communicating relation with one of said scanner openings, said reader head means further including photosensor lamp means supported by said scanner head, said scanner head including a plurality of light passages one each communicating between each of said scanner openings and said photosensor lamp means, the longitudinal axes of said light passages being angularly inclined at about 30 degrees with the plane of said surface adjacent said guide path, said photosensor lamp means serving to transmit photosensor light outwardly through each of said light passages and said scanner openings for effecting light impingement upon the index registration indicia and program indicia of the card moving along said guide path adjacent said scanner openings, said light sensor means serving to simultaneously directly detect light reflection from both the index registration indicia and any light reflective markings on the printed program indicia of successive data lines of the card moving along said guide path, printing means supported by said chassis means adjacent said guide path and defining a printing line transversely aligned with said detecting position of said reader head means, and operating means controlled by the detection of light reflection from instructional markings on the program area of the card for enabling said printing means to effect printing of indicia on the printing area of successive data lines of the card disposed within said guide path adjacent said printing line when instructional markings in the corresponding data lines are detected by said light sensor means.

12. For use in transporting, reading and printing a sales order card having a plurality of individual index registration indicia printed thereon in a column, a program area with a plurality of transversely-aligned individual program indicia printed thereon in a plurality of rows each row of which is transversely aligned with one of the index registration indicia and upon the program indicia of which instructional markings are made by selectively manually placing light reflective markings thereon, and a printing area to receive printed indicia thereon, the index registration indicia, program area and printing area of the card being selectively aligned to establish a plurality of data lines, apparatus comprising, in combination, chassis means including means defining a guide path for the card transported through the apparatus, means supported by said chassis means for engaging the card upon entry into said guide path and effecting movement of the car along said guide path, reader head means supported by said chassis means adjacent said guide path and defining a detecting position, said reader head means including light source means for effecting light impingement upon the index registration indicia and program indicia of the card moving along said guide path, said reader head means further including light sensor means to simultaneously directly detect light reflection from both the index registration indicia and any light reflective markings on the printed program indicia of successive data lines of the card moving along said guide path, printing means supported by said chassis means adjacent said guide path and defining a printing line transversely aligned with said detecting position of said reader head means, said printing means including a generally cylindrical printing head having a plurality of printing characters circumferentially spaced in annular rows about the peripheral surface thereof and movable to position selected of said printing characters on said printing line, each of said annular rows of printing characters comprising two identical semi-annular sets of printing characters so as to sequentially disclose all printing characters of a set on said printing line during a half revolution of said printing head, and operating means controlled by the detection of light reflection from instructional markings on the program area of the card for enabling said printing means to effect printing of indicia on the printing area of successive data lines of the card disposed within said guide path adjacent said printing line when instructional markings in the corresponding data lines are detected by said light sensor means.

13. Apparatus as defined in claim 12 wherein said printing means further includes printing hammer means operative to urge selected portions of the card disposed adjacent said printing line against printing characters positioned on said printing line.

14. Apparatus as defined in claim 13 wherein said printing characters comprising each annular row are each longitudinally aligned with identical printing characters in the remaining rows.

15. Apparatus as defined in claim 14 wherein each of said annular rows of printing characters comprises numerical digits, said annular rows each comprising two sets of numerical digits arranged in seriatim order from zero to 9 and being equidistantly circumferentially spaced about the peripheral surface of said printing head.

16. Apparatus as defined in claim 12 wherein said printing means includes a stepping motor operatively associated with said printing head position selected of said printing characters on said printing line.

17. Apparatus as defined in claim 16 including magnetic pick-up means supported by said chassis means and operatively associated with said printing head for detecting the printing head rotational position.

18. Apparatus as defined in claim 13 wherein said printing means includes inking ribbon means supported by said chassis means between said printing head and said printing hammer means, said printing hammer means being operative to effect engagement of the card with said inking ribbon means when the card is disposed adjacent said printing line to effect printing of printing indicia on the card.

19. Apparatus as defined in claim 18 wherein said inking ribbon means comprises a fixed length of inking ribbon, and including inking ribbon support means to effect reversible translational movement of said inking ribbon.

20. Apparatus as defined in claim 14 wherein said printing hammer means includes a printing hammer supported to correspond to each annular row of printing characters.

21. Apparatus as defined in claim 13 wherein said printing head comprises a rotatably supported cylindrical body having said annular rows of printing characters equidistantly circumferentially spaced about the peripheral surface thereof, each of said annular rows including an equal number of similar printing characters longitudinally aligned with identical printing characters in the remaining annular rows of printing characters to define longitudinal rows of identical printing characters selectively positionable on said printing line, and wherein said printing hammer means comprises a printing hammer corresponding to each of the annular rows of printing characters, said printing hammers being responsive to signals from said reader head means to urge selected portions of the card disposed in said guide path adjacent said printing line toward printing characters positioned on said printing line.

22. Apparatus as defined in claim 21 including inking ribbon means supported by said chassis means between said printing line and said printing hammer means, said printing hammer means being operative to effect engagement of the card disposed adjacent said printing line against said inking ribbon means to effect printing of printing indicia on the portion of the card engaged by said printing hammer means.

23. Apparatus as defined in claim 22 including resilient means supported by said chassis means adjacent said printing line and serving to prevent engagement of the card disposed within said guide path adjacent said printing line with said inking ribbon means except those portions of the card engaged by said printing hammers.

24. For use in transporting, reading and printing a sales order card having a plurality of individual index registration indicia printed thereon in a column, a program area with a plurality of transversely-aligned individual program indicia printed thereon in a plurality of rows each row of which is transversely aligned with one of the index registration indicia and upon the program indicia of which instructional markings are made by selectively manually placing light reflective markings thereon, and a printing area to receive printed indicia thereon, the index registration indicia, program area and printing area of the card being selectively aligned to establish a plurality of data lines, apparatus comprising, in combination, chassis means including means defining a guide path for the card transported through the apparatus, means supported by said chassis means for engaging the card upon entry into said guide path and effecting movement of the card along said guide path, reader head means supported by said chassis means adjacent said guide path and defining a detecting position, said reader head means including light source means for effecting light impingement upon the index registration indicia and program indicia of the card moving along said guide path, said reader head means further including light sensor means to simultaneously directly detect light reflection from both the index registration indicia and any light reflective markings on the printed program indicia of successive data lines of the card moving along said guide path, printing means supported by said chassis means adjacent said guide path and defining a printing line transversely aligned with said detecting position of said reader head means, said printing means including support plate means pivotally supported by said chassis means, said printing means further including a printing head and inking ribbon support means and drive motor means each supported by said support plate means, said drive motor means being operatively connected to said printing head for effecting rotational movement thereof, said support plate means being movable between a first position wherein said printing head is in close spaced relation to said guide path and a second position wherein said printing head, drive motor means and inking ribbon support means are substantialy removed from said guide path for providing access thereto, and operating means controlled by the detection of light reflection from instructional markings on the program area of the card for enabling said printing means to effect printing of indicia on the printing area of successive data lines of the card disposed within said guide path adjacent said printing line when instructional markings in the corresponding data lines are detected by said light sensor means.

References Cited

UNITED STATES PATENTS

| | | | |
|---|---|---|---|
| 2,508,953 | 5/1950 | Knutsen | 197—1 U X |
| 3,017,980 | 1/1962 | D'Onofrio | 197—114 |
| 3,122,228 | 2/1964 | Dollenmayer et al. | 197—186 X |
| 3,143,063 | 8/1964 | Stark | 197—180 X |
| 3,232,404 | 2/1966 | Jones | 197—49 |
| 3,288,264 | 11/1966 | Gabrielson et al. | 197—180 X |
| 3,291,043 | 12/1966 | Bernard | 197—151 X |
| 3,309,989 | 3/1967 | Solheim et al. | 197—49 X |
| 3,391,775 | 7/1968 | Frobel | 197—138 X |
| 3,456,772 | 7/1969 | Templeton | 197—127 |
| 3,555,183 | 1/1971 | Ladd et al. | 197—49 X |
| 1,126,451 | 1/1915 | Hagerstrom | 197—138 A |
| 2,831,560 | 4/1958 | Oberholzer et al. | 197—128 |
| 3,139,818 | 7/1964 | Koehn | 197—127 X |
| 3,508,637 | 4/1970 | Hull et al. | 197—133 |
| 2,079,337 | 5/1937 | Roe et al. | 197—127 X |
| 2,181,992 | 12/1939 | Ghertman | 197—127 X |
| 2,278,118 | 3/1942 | Pitman | 197—Dig. 9 |
| 3,100,037 | 8/1963 | Green et al. | 197—127 |
| 3,254,594 | 6/1966 | Phelan et al. | 197—127 X |
| 3,508,032 | 4/1970 | MacDuffee et al. | 197—127 X |
| 3,581,862 | 6/1971 | Sandrone et al. | 197—127 |

FOREIGN PATENTS 667,478 7/1963 Canada.

ERNEST T. WRIGHT, Jr., Primary Examiner

U.S. Cl. X.R.

101—93; 197—49, 165